Patented Dec. 23, 1952

2,623,020

UNITED STATES PATENT OFFICE 2,623,020

PREPARATION OF ZINC ALUMINATE SPINELS AND THE ADDITION OF GROUP VI CATALYSTS THERETO

George R. Gilbert, Elizabeth, N. J., assignor to Standard Oil Development Company, a corporation of Delaware No Drawing. Application December 10, 1949, Serial No. 132,413

9 Claims. (Cl. 252—463)

The present invention relates to improvements in the manufacture of catalysts, especially those employed for the conversion of hydrocarbons, and, more particularly, it relates to improvements in catalysts useful in reforming of naphthas and/or aromatizing aliphatic hydrocarbons.

It is known that petroleum naphthas can be subjected to a reforming operation to yield liquid products boiling within the gasoline range and possessing improved octane numbers. Reforming processes employing catalysts are widely used in the petroleum industry, especially the hydroforming and aromatization processes. By "hydroforming" is ordinarily meant an operation conducted at elevated temperatures and pressures in the presence of a solid catalyst and added hydrogen, wherein a hydrocarbon fraction is increased in aromaticity and wherein there is no net consumption of hydrogen. The term "aromatization" when used broadly refers to reactions which increase the aromaticity of hydrocarbons. As generally used in the industry it refers to an operation in which a hydrocarbon fraction is treated at elevated temperatures in the presence or absence of hydrogen, usually at pressures lower than those employed in hydroforming, in the presence of a solid catalyst, for the purpose of increasing the aromaticity of the hydrocarbon fraction. The invention will be described with particular reference to catalytic reforming, but it should be understood that it is applicable to the production of catalysts for various reactions including hydrogenation and dehydrogenation.

Catalytic reforming operations are usually carried out at temperatures of around 750–1100° F. in the presence of such catalysts as molybdenum oxide, chromium oxide, nickel sulfide, or tungsten sulfide, or any of a number of oxides or sulfides of metals of groups IV, V, VI, VII and VIII of the periodic system. These catalysts are usually supported on a base or spacing agent. A commonly used spacing agent or base is alumina, either of the gel type or precipitated alumina. For example, a good catalyst for reforming or hydroforming is one containing about 10% molybdenum oxide supported on an alumina base prepared by heat-treating hydrated aluminum oxide. However, alumina in its various forms is not heat stable, particularly at regeneration temperatures which are of the order of 1000–1200° F. At temperatures of 1100° F., or higher, alumina is definitely impaired by prolonged heating, and this impairment is reflected in the loss of activity of the catalyst composition of which the alumina is the support or spacing agent.

It has been found that alumina may be treated to increase its heat resistance so that it may act more efficiently as a support for high temperature catalytic processes, such as reforming and aromatization, and will have a high degree of activity under the most severe temperature conditions for an extended period of time. It has been proposed to prepare such heat stable catalyst bases or supports by combining aluminum oxide with zinc oxide, preferably in molecular proportions, thereby forming zinc aluminate. This combination forms a true chemical compound of the spinel type and is not a mere mechanical mixture as shown by examination of the lattice spacing in accordance with the well-known procedure of X-ray diffraction. Such zinc aluminate spinels are not only more heat stable than ordinary alumina but also they form more active catalyst compositions when compounds such as molybdenum oxide or chromium oxide are deposited thereon than when the same catalytic metal oxides are deposited in the same amounts upon alumina supports.

Zinc aluminate spinel bases or supports have ordinarily been prepared by reacting aqueous solutions of the metal salts with basic solutions such as ammonium hydroxide or sodium hydroxide or in some cases by using the sodium metallate and a salt of the other metal, for example, sodium aluminate and zinc sulfate, nitrate or chloride. The precipitate is washed, impregnated with other materials if desired, dried and calcined.

A disadvantage of these zinc aluminate spinels has been their relatively high cost which may be attributed to the fact that expensive metal salts of a high degree of purity and large amounts of ammonia or other basic precipitant are required for their manufacture.

It is the object of this invention to provide a more economical, novel method of preparing mixed oxide catalysts.

It is also the object of this invention to provide the art, with a novel, more economical method of preparing spinels.

It is also the object of this invention to prepare reforming catalysts of improved activity and stability.

These and other objects will appear more clearly from the detailed specification and claims which follow.

The invention will be described with reference to spinels, although it is to be understood that it is not so limited but is applicable broadly to mixed zinc oxide-alumina catalyst supports.

It has now been found that excellent hydrocarbon conversion catalyst supports comprising zinc aluminate spinel or other mixtures of zinc oxide and alumina can be prepared more economically by dissolving zinc oxide in an aqueous solution of an aluminum salt and then treating the resultant reaction mixture with aqueous ammonium hydroxide to precipitate zinc and aluminum hydroxide. The precipitate is then washed, impregnated with a catalytic metal compound, dried and calcined. In this way, only six mols of ammonium hydroxide are required for each mol of zinc aluminate formed, whereas in the customary procedure of precipitating zinc and aluminum nitrate solutions, two additional mols are required to precipitate the zinc hydroxide from the zinc nitrate solution making a total of eight mols of ammonium hydroxide necessary for the formation of one mol of zinc aluminate. This, coupled with the fact that zinc oxide is a cheaper starting material than zinc sulfate, nitrate or chloride makes for a very economical process for preparing zinc aluminate spinels. It has been found, moreover, that reforming catalysts comprising molybdenum oxide and the like on zinc aluminate spinels prepared in this way are characterized by high activity and low carbon forming tendencies. While zinc oxide and aluminum salt are preferably used in such amounts as to form a spinel, they may also be used in other ratios to give mixed zinc oxide-alumina compositions which are useful as catalyst supports.

Water soluble aluminum salts that can be reacted with zinc oxide to form zinc aluminate spinels include such compounds as aluminum nitrate, aluminum chloride and aluminum sulfate, or, in general, the soluble aluminum salts of strong mineral acids. Zinc oxide may be dissolved in aqueous solutions of these aluminum salts at room temperature or at elevated temperatures of up to about 200° F. or higher. When solution of the zinc oxide has been completed, a basic solution is added to precipitate the zinc and aluminum hydroxides. Precipitation is preferably effected with ammonium hydroxide although, if desired, sodium or potassium hydroxide could also be used. The precipitate is separated from the reaction liquid as by filtering and is washed essentially free of water soluble material.

The washed precipitate may then be dried or preferably it is impregnated with a solution of a compound of a highly catalytic metal, such as ammonium molybdate, chromium nitrate, or the like. The amount of the catalytic metal compound added is ordinarily sufficient to provide from about 5 to 30 weight percent of the corresponding metal oxide in the final composition. Preferred compositions comprise from 5 to about 12 weight percent of molybdenum oxide with 95 to about 88 weight percent of zinc aluminate spinel or from about 10 to about 25 weight percent of chromium oxide with from about 90 to about 75 weight percent of zinc aluminate spinel. The compounds of the highly active catalytic metals such as Mo, Cr, Fe, Co, Ni, Ti, V, etc. can, of course, be incorporated in the catalyst prior to precipitation, if desired.

The following examples are illustrative of the present invention.

*Example 1.—Catalyst prepared according to the customary procedure (Procedure A)*

1012 grams of $Al(NO_3)_3 \cdot 9H_2O$ and 336 grams of fused zinc nitrate were dissolved in 1600 cc. water at ambient temperature. 665 grams of concentrated ammonia were diluted with enough water to make 1600 cc. of solution. These two solutions were added simultaneously to approximately 1 liter of water which was stirred vigorously, the final pH being adjusted to approximately 6.5. The precipitate was filtered, washed and mulled with 30.7 grams of ammonium molybdate, dissolved in dilute ammonia to make a thick paste. The composite was dried at 250° F., calcined for 3 hours at 1200° F. and pilled.

*Catalyst prepared according to this invention (Procedure B)*

1012 grams of $Al(NO_3)_3 \cdot 9H_2O$ were dissolved in 1600 cc. water at ambient temperature. 222 grams of commercial ZnO were dissolved in this solution. Another solution was made by mixing 500 grams of concentrated ammonia (compared with 665 grams used for the catalyst prepared in the customary manner, Procedure A). These two solutions were added simultaneously to approximately 1 liter of water which was stirred vigorously, the final pH being adjusted to approximately 6.5. The precipitate was filtered, washed, mulled with sufficient ammonium molybdate solution to give the same percentage composition as in Procedure A and finished as in Procedure A above.

Upon testing the catalysts at atmospheric pressure and 1000° F., in a KA2 reactor using 1.2 volumes of liquid normal heptane per hour per volume of catalyst, the following results were obtained:

|  | Prepared According to— | | Advantage, Proc. B over Proc. A |
|---|---|---|---|
|  | Procedure A, Customary Manner | Procedure B, This Invention |  |
|  |  |  | *Percent* |
| Wt. $NH_3$/Wt. $ZnO \cdot Al_2O_3$ | 0.75 | 0.56 | 25 |
| Aromatics produced, vol. percent | 40 | 40 | 15 |
| Carbon produced, wt. percent | 7.3 | 6.7 | 8 |

It is evident from the above data that catalysts produced according to this invention are more active in that they produce 15% more aromatics (46% vs. 40%) and 8% less coke (6.7 weight percent vs. 7.3 weight percent). The improved catalysts are cheaper to produce, since 25% less ammonia (0.56 g. vs. 0.75 g. per gram of $ZnO \cdot Al_2O_3$) and a cheaper starting material, ZnO versus the more expensive salt used in the customary process, are used.

The foregoing description contains a limited number of embodiments of the present invention. It will be understood that numerous variations are possible without departing from the scope of the following claims.

What is claimed is:

1. The method of preparing a base for hydrocarbon conversion catalysts which comprises dissolving zinc oxide in an aqueous solution of an aluminum salt of a strong mineral acid, adding a basic precipitant to the resultant solution, separating and washing the precipitate.

2. The method of preparing hydrocarbon conversion catalysts which comprises dissolving zinc oxide in an aqueous solution of an aluminum salt of a strong mineral acid, adding a basic precipitant to the resultant solution, separating and washing the precipitate, impregnating the precipitate with an amount of a group VI catalytic metal compound in aqueous solution equivalent to from about 5 to 30 weight percent of the corresponding metal oxide in the final composition, drying and calcining the mixture.

3. The method of preparing a base for hydrocarbon conversion catalysts which comprises dissolving zinc oxide in an aqueous solution of an aluminum salt of a strong mineral acid, adding ammonium hydroxide to the resultant solution, separating and washing the precipitate.

4. The method of preparing hydrocarbon conversion catalysts which comprises dissolving zinc oxide in an aqueous solution of an aluminum salt of a strong mineral acid, adding ammonium hydroxide to the resultant solution, separating and washing the precipitate, impregnating the precipitate with an amount of a group VI catalytic metal compound in aqueous solution equivalent to from about 5 to 30 weight percent of the corresponding metal oxide in the final composition, drying and calcining the mixture.

5. The method of preparing a hydrocarbon conversion catalyst which comprises dissolving zinc oxide in an aqueous solution of an aluminum salt of a strong mineral acid, adding ammonium hydroxide to the resultant solution, separating and washing the precipitate, impregnating the precipitate with a solution of ammonium molybdate in an amount equivalent to from about 5 to 30 percent of molybdena based on the total dry weight of said molybdena and said precipitate, drying and calcining the mixture.

6. The method of preparing hydrocarbon conversion catalyst which comprises dissolving zinc oxide in an aqueous solution containing a molecularly equivalent amount of aluminum nitrate, adding ammonium hydroxide to the resultant solution, separating and washing the resulting zinc aluminate precipitate, impregnating the precipitate with a solution of ammonium molybdate in an amount equivalent to from about 5 to 12 weight percent of molybdena based on total zinc aluminate plus molybdena in the final composition, drying and calcining the mixture.

7. The method of preparing hydrocarbon conversion catalyst which comprises dissolving zinc oxide in an aqueous solution of an aluminum salt of a strong mineral acid, adding ammonium hydroxide to the resultant solution, separating and washing the precipitate, impregnating the precipitate with an amount of chromium nitrate equivalent to from about 10 to 25 weight percent of chromium oxide based on the dry weight of the finished catalyst, drying and calcining the mixture.

8. The method of preparing hydrocarbon conversion catalyst which comprises dissolving zinc oxide in an aqueous solution of an aluminum nitrate, adding ammonium hydroxide to the resultant solution, separating and washing the precipitate, impregnating the precipitate with an amount of chromium nitrate equivalent to from about 10 to 25 weight percent of chromium oxide based on the dry weight of the finished catalyst, drying and calcining the mixture.

9. The method of preparing hydrocarbon conversion catalysts which comprises dissolving zinc oxide in an aqueous solution of an aluminum salt of a strong mineral acid, adding ammonium hydroxide to the resultant clear solution and thereby adjusting the pH to about 6.5, separating and washing the precipitate of zinc and aluminum hydroxides thus formed, impregnating the precipitate with an amount of a group VI metal compound in aqueous solution equivalent to from about 5 to 30 weight percent of the corresponding metal oxide based on the final composition, drying, and calcining the mixture at a temperature of up to about 1200° F.

GEORGE R. GILBERT.

REFERENCES CITED

The following references are of record in the file of this patent:

UNITED STATES PATENTS

| Number | Name | Date |
|---|---|---|
| 2,269,508 | Barton | Jan. 13, 1942 |
| 2,279,198 | Huppke | Apr. 7, 1942 |
| 2,447,016 | Kearby | Aug. 17, 1948 |